United States Patent [19]

Tellert et al.

[11] Patent Number: 4,591,034
[45] Date of Patent: May 27, 1986

[54] CONTROLLABLE DRIVE FOR A MOVABLE RELEASER OF A MOTOR VEHICLE FRICTION CLUTCH

[75] Inventors: Rudy Tellert, Schweinfurt; Rudolf Peschel, Poppenhausen, both of Fed. Rep. of Germany

[73] Assignee: Sachs-Systemtechnik GmbH, Schweinfurt, Fed. Rep. of Germany

[21] Appl. No.: 620,105

[22] Filed: Jun. 13, 1984

[30] Foreign Application Priority Data

Jun. 15, 1983 [DE] Fed. Rep. of Germany ....... 3321578

[51] Int. Cl.⁴ .............................................. F16D 25/00
[52] U.S. Cl. .................. 192/3.58; 192/84 R; 251/129.11
[58] Field of Search ................... 192/3.58, 3.59, 84 R, 192/85 R, 85 V; 251/133

[56] References Cited

U.S. PATENT DOCUMENTS

| | | | |
|---|---|---|---|
| 2,931,180 | 4/1960 | Randol | 188/357 X |
| 3,377,045 | 4/1968 | Welcker | 251/48 |
| 3,410,178 | 11/1968 | Kytta | 91/369 |
| 4,144,958 | 3/1979 | Polyak et al. | 192/105 F |
| 4,281,751 | 8/1981 | Suga et al. | 192/0.092 |

FOREIGN PATENT DOCUMENTS

| | | | |
|---|---|---|---|
| 3028250 | 3/1982 | Fed. Rep. of Germany | 60/41.02 |
| 3043347 | 7/1982 | Fed. Rep. of Germany | 60/41.02 |
| 3043348 | 7/1982 | Fed. Rep. of Germany | 60/41.02 |

*Primary Examiner*—Samuel Scott
*Assistant Examiner*—Allen J. Flanigan
*Attorney, Agent, or Firm*—Toren, McGeady, Stanger, Goldberg & Kiel

[57] ABSTRACT

The controllable drive for a movable releaser of a friction clutch which couples a transmission of a motor vehicle with its internal combustion engine comprises an electric motor and a force-transmission device converting the rotating movement of a drive-output shaft of the electric motor into the actuating movement of the releaser. In the force path of the force-transmission device there is arranged a hydraulic servo-unit, but preferably a suction-pneumatic servo-unit, which transfers the movement of its input element into a proportional movement of its output element and transmits the force exerted upon the input element in boosted form to the output element. In the force transmission in the disengagement direction, the input element abuts on the output element directly or through a likewise movable additional element of the servo-unit, in order to be able to disengage the clutch even when the internal combustion engine is stopped. By reason of the servo-unit the electric motor can be of smaller dimensions. Nevertheless the clutch can be engaged and disengaged quickly.

3 Claims, 2 Drawing Figures

CONTROLLABLE DRIVE FOR A MOVABLE RELEASER OF A MOTOR VEHICLE FRICTION CLUTCH

BACKGROUND OF THE INVENTION

The invention relates to a controllable drive for a movable releaser of a friction clutch which couples a transmission of a motor vehicle with its internal combustion engine, having an electric motor and a force-transmission device which converts the rotating movement of a drive-output shaft of the electric motor into the actuating movement of the releaser.

STATEMENT OF PRIOR ART

Devices for the automatic actuation of a motor vehicle friction clutch are known from German Publication Specifications Nos. 3,028,250, 3,043,347 and 3,043,348, in which the releaser is driven by an electric motor which moves it between a disengagement position, in which the clutch is completely released, and an engagement position in which the clutch is fully engaged. A program control system adjusts the position of the releaser in the slipping range of the clutch, that is between a position of commencing torque transmission and the engagement position, according to a characteristic predetermined by a function generator, in dependence upon the engine rotation rate. The function generator prepares several characteristics of position/engine rotation rate which are selected automatically in dependence upon further parameters, for example the gear-change position of the transmission or the driving speed, so that the speed of engagement of the clutch is adapted to the most various driving situations of the motor vehicle.

In several driving situations the clutch must be engaged or disengaged rapidly. The electric motor used for the driving of the releaser of the clutch would have to be correspondingly stoutly dimensioned in order to be adequate for these requirements even in long-term operation. Accordingly, the driver stages of the electronic program control system would have to be dimensioned for great power. Since the friction clutch must be held in the disengagement position by the electric motor against the resistance of the clutch springs, the electric motor must be capable of taking up the holding current in long-term operation, the heat generation of the then stopped electric motor being especially great.

OBJECT OF THE INVENTION

An object of the invention is to indicate a way in which the movable releaser of a motor vehicle friction clutch can be moved quickly by means of an electric motor despite relatively low power of the motor.

SUMMARY OF THE INVENTION

On the basis of the controllable drive as explained in greater detail at the outset, this problem is solved in accordance with the invention in that in the force path of the force-transmission device there is arranged a hydraulic or pneumatic servo-unit which transmits the movement of its input element in a proportional movement of its output element and transmits the force exerted upon the input element in a boosted manner to the output element. The servo-unit transmits the movement of its input element to its output element with relatively short time delay determined by its regulation behaviour. Thus the output element with boosted force follows even rapid movements of the input element. In this way an electric motor of even relatively slight or small dimensions suffices for the drive of the releaser of the friction clutch. The nominal or rated torque of this motor can be reduced by the power boost factor of the servo-unit in comparison with motors used hitherto.

The servo-unit is preferably a vacuum servo-unit which is fed from the suction manifold of the internal combustion engine or a suction pump driven by the internal combustion engine. By way of example vacuum servo-units such as are used as brake servo-units in motor vehicles are suitable.

The output element of the servo-unit can be coupled mechanically for example with a release fork of the friction clutch. Hydraulic force transmission is advantageous, especially when standard production brake servo-units are used for economical reasons.

Vaccuum servo-units are not fed when the internal combustion engine is stopped. In order that, nevertheless, the clutch may be disengaged, for example for starting the internal combustion engine, it is preferredly provided that the input element abuts on the output element directly or through a likewise movable additional element of the servo-unit, in force transmission in the disengagement direction. In this case the electric motor is so dimensioned that its starting torque suffices to disengage the clutch, despite the fact that the servo-unit is not operative. Even if the motor current, flowing when the servo-unit is inoperative, lies considerably above the nominal current for which the motor is dimensioned for normal operation with servo-unit in operation, this can be tolerated since it is a matter of an action which occurs briefly and is not soon repeated thereafter. The electric motor is expediently so dimensioned that its starting torque is about 10 to 20% greater than the torque necessary for the movement of the releaser when the servo-unit is inoperative.

The starting torque of the electric motor should be relatively great in relation to its nominal torque. The electric motor is preferably a direct-current series-wound motor or still better a direct-current motor with permanentmagnet stator, since in these motors the direction of rotation can be reversed by simple reversal of current direction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENT

Figure 1:
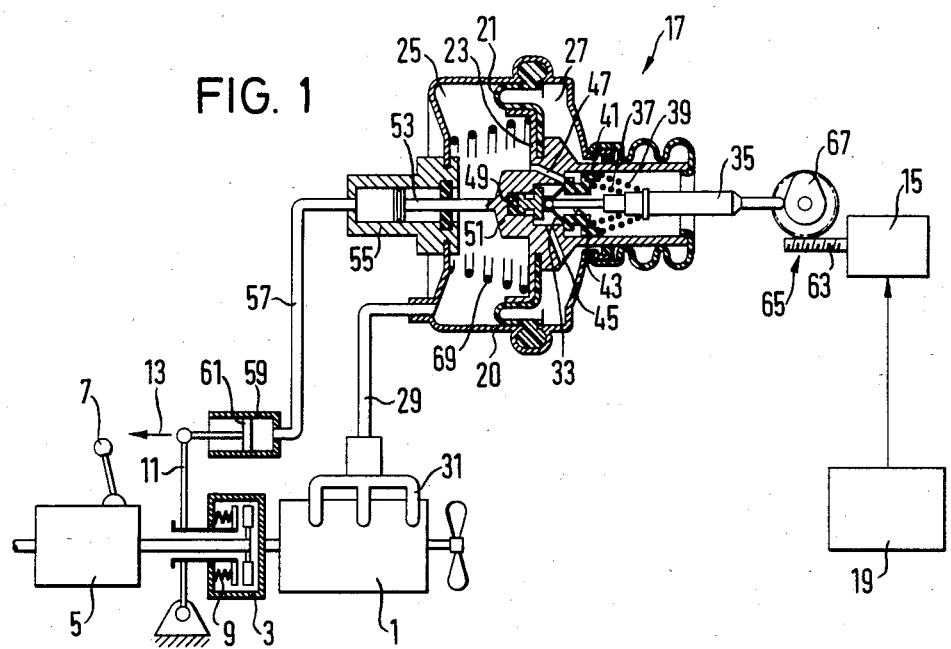
FIG. 1 shows a diagrammatic representation of a drive device for the releaser of a motor vehicle friction clutch.

FIG. 1 shows an internal combustion engine 1 of a motor vehicle which can be coupled through a friction clutch 3 with the transmission 5, the gears of which can be changed by means of a gear-change lever 7. The friction clutch 3 can be of conventional construction and is held by one or more clutch springs 9 in the engaged condition in which the internal combustion engine 1 is coupled non-rotatably with the transmission 5. On movement of a releaser of the friction clutch 3, for example a releaser fork 11, in the disengaging direction indicated by an arrow 13 in FIG. 1, the clutch is disengaged. The position of the releaser fork 11 and thus the torque transmitted by the clutch 3 are determined by an electric motor 15 which acts through a servo-unit 17 upon the releaser fork 11 in a manner explained in greater detail hereinafter. A program control system 19 controls the electric motor 15 in dependence upon the gear-change position of the transmission 5, the rotation rate of the internal combustion engine 1 and possibly in dependence upon further parameters, such as for example the driving speed of the motor vehicle, as explained in the initially mentioned German Publication Specifications Nos. 3,028,250, 3,043,347 and 3,043,348 in detail. In this manner an automatic disengagement and engagement operation of the clutch 3 results.

The servo-unit 17 is a vacuum servo-unit such as is usual in power-assisted brakes. It comprises a housing 20 which is divided by an elastic diaphragm 21 and a piston 23 displaceable in the housing 20 into a suction chamber 25 and a control chamber 27. The suction chamber 25 is connected through a conduit 29 to a suction manifold 31 of the internal combustion engine. The control chamber 27 can be subjected, by means of a control valve 33, to the action of either suction from the suction chamber 25 or atmospheric pressure from the ambient air. The control valve 33 is connected with a valve-operating rod 35 which, under initial stress from return springs 37, 39, presses the valve body of the control valve against an elastic valve seating 41. In this position the valve body of the control valve closes a connecting passage 43 in the valve seating 41 which connects the ambient air through a control passage 45 with the control chamber 27. A connecting passage 47 connects the control chamber 27 with the suction chamber 25.

The operating rod 35 abuts through the valve body of the control valve 33 and an elastic cushion 49 against a piston carrier 51 connected with a piston rod 53 of a master cylinder 55. The master cylinder 55 is connected through a hydraulic conduit 57 with a hydraulic slave cylinder 59 the piston 61 of which can load the releaser fork 11 in the release direction 13 against the force of the clutch spring 9. A worm gearing 65 is coupled to an output shaft 63 of the electric motor 15, and drives a cam 67 which in turn acts upon the operating rod 35.

The clutch drive system works as follows:

With the clutch engaged, a spring 69 shifts the piston 23 into its position on the right in FIG. 1. The control valve 33 closes the control passage 45 from the ambient air. The control chamber 27, like the suction chamber 25, is situated at the negative pressure determined by the suction manifold or system 31. If the control system 19 gives the control command for the disengagement of the clutch, the motor 15 is switched on so that the cam 67 moves the operating rod 35 to the left in FIG. 1. The control valve 33 is thereby opened so that the pressure in the control chamber 27 rises and the piston 23, including the piston carrier 51 carrying the valve seating 41, follows the movement of the operating rod 35 with boosted power. The movement of the piston 23 acts through the master cylinder 55 upon the slave cylinder 59 and disengages the clutch 3.

If the motor 15 is switched on in the opposite direction of rotation, the operating rod 35 is shifted to the right in FIG. 1 and the control valve 33 closes the connection of the control passage 45 to the ambient air. Through the connecting passage 47 the pressure in the control chamber 27 is lowered again, whereby the piston 23 likewise shifts to the right and the master cylinder 55 and thus the releaser fork 11 are relieved of load.

Figure 2:
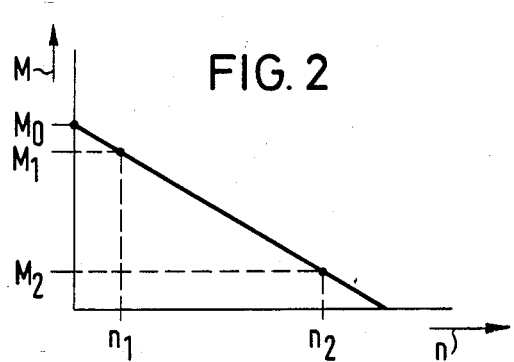
FIG. 2 shows a diagram showing the torque M of an electric motor, used for the drive, in dependence upon its rotation speed n.

The operating rod 35 abuts through the valve body of the control valve 33 and the buffer 49 upon the piston carrier 51 so that the electric motor 15 can disengage the clutch 3 even when the internal combustion engine 1 is stopped. The starting torque $M_0$, as the torque/rotation rate diagram in FIG. 2 shows, is somewhat greater than the torque $M_1$ necessary for the actuation of the clutch, with the servo-unit 17 out of action. The starting torque $M_0$ is for example 10 to 20% greater than the torque $M_1$. Since these operational situations are exceptional, it can be accepted that the motor rotation rate $n_1$ pertaining to the torque $M_1$, according to the characteristic curve of the electric motor 15 is comparatively low, so that the clutch 3 is only relatively slowly disengaged. In normal operation, for which the electric motor 15 is designed, on the other hand a relatively high rotation rate $n_2$ is reached and the clutch 3 is operated relatively quickly. According to the characteristic curve of the motor in this case only a relatively small torque $M_2$ is achieved which however is boosted through the servo-unit 17 to such extent that in normal operation it suffices for the disengagement of the clutch 3. A comparatively great current lying above the nominal current is allocated to the torque $M_1$. However the dimensioning of the electric motor 15 is determined according to the current flowing for the torque $M_2$. The electric motor 15 is preferably a direct-current motor with permanent-magnet stator.

While specific embodiments of the invention have been shown and described in detail to illustrate the application of the inventive principles, it will be understood that the invention may be embodied otherwise without departing from such principles.

What is claim is:

1. In a controllable drive for a movable releaser (11) of a friction clutch (3) coupling a transmission (5) of a motor vehicle with an internal combustion engine (1) of the motor vehicle, comprising
   (a) a servo unit (17) operated one of hydraulically or pneumatically and having an input element (35) and an output element (51), said servo unit beig arranged for transmitting the force applied to the input element (35) amplified to the output element (51), the output element (51) being coupled with the releaser (11) for displacing the releaser in the release direction and in the case of a movement of the input element (35) the output element executes a movement proportional thereto,
   (b) a buffer (49) between the input element and the output element, whereby when the force amplification of the servo unit (17) is not available, the buffer transmits the force applied to the input element in the release direction directly to the output element (51), and
   (c) an electromotor (15) with a rotatable output shaft (63) and a force transmitting device (65, 67) coupling the output shaft (63) with the input element (35) of the servo unit (17), said force transmitting device changes a rotating motion of the output shaft (63) into the actuating movement of the input element (35), wherein the electromotor (15) is so dimensioned that its starting torque suffices for the movement of the releaser (11) of the friction clutch (3) with the servo-unit (17) out of action, but its nominal torque does not.

2. A drive according to claim 1, wherein the electric motor is so dimensioned that its starting torque is about 10 to 20% greater than the torque necessary for the movement of the releaser with the servo-unit out of action.

3. A drive according to claim 1, wherein the electric motor is formed as a direct-current motor with a permanent-magnet stator.

* * * * *